Nov. 6, 1934.  P. A. KINZIE  1,980,067
PRESSURE ACTUATED VALVE
Filed June 16, 1931  3 Sheets-Sheet 2

Inventor:
Phillip A. Kinzie,
By Byrnes Townsend & Potter,
Attorneys.

Nov. 6, 1934.   P. A. KINZIE   1,980,067
PRESSURE ACTUATED VALVE
Filed June 16, 1931   3 Sheets-Sheet 3

Inventor:
Phillip A. Kinzie,
By Byrnes, Townsend & Potter,
Attorneys.

Patented Nov. 6, 1934

1,980,067

UNITED STATES PATENT OFFICE 1,980,067

PRESSURE ACTUATED VALVE

Phillip A. Kinzie, Denver, Colo., assignor to Universal Hydraulic Corporation, Denver, Colo., a corporation of Colorado Application June 16, 1931, Serial No. 544,880

39 Claims. (Cl. 137—139)

This invention relates to pressure actuated valves and, while not limited thereto, is particularly useful as applied to valve structures capable of controlling fluid flow in conduits of a diameter of six or seven feet and upward.

A valve such as contemplated by my invention is commonly known to those skilled in the art as a needle valve, by means of which the flow of water or other fluid in a pipe line or conduit is controlled and regulated or stopped at will, and in which the moving element or needle of the valve is actuated hydraulically by the pressure of the fluid within the pipe line or conduit or from pressure fluid supplied from an independent source of supply, or both, and such a needle valve might, for example, be used in a city water main, at the outlet end of a conduit passing through a dam, or in a penstock leading to a hydraulic turbine, where in each case it would be used for controlling or stopping the flow through the system in which it is used. Besides these specific applications mentioned for the purpose of illustration of its use, there are of course many other applications.

The general type of needle valve contemplated by the invention is described in the United States Patent No. 1,750,417 to McClellan et al., granted March 11, 1930. An object of the invention is to improve and to simplify the construction of valves such as therein illustrated, thereby to obtain economy in production and ease in operation.

An object is to provide a valve whose component parts are so designed as to simplify foundry work and machining, with the weight and consequently the cost of production reduced, and in which the parts are so interrelated as to facilitate assembly and installation in the shop and in the field, thus simplifying and reducing maintenance requirements after the valve is installed and in active service.

Another object is to provide a valve in which the working clearance between the needle and needle case does not result in the inadvertent transfer of pressure fluid to or from the actuating chambers. A further object is to provide a valve having two pressure chambers for actuating the valve, both of the chambers being contained within the needle of the valve and of such design that the effective area of the valve opening chamber is but little less than the effective area of the valve closing chamber. Further objects are to provide a valve in which practically fluid-tight working joints are provided for the pressure working chambers, and in which either actuating chamber is, when it constitutes the passive chamber, positively protected from any appreciable intrusion of pressure fluid from the then operative pressure chamber and may be exhausted to atmosphere or other desired low pressure. A further object is to provide a valve in which the actuating chambers are automatically freed of air when pressure fluid is introduced into the chambers, and in which the chambers are drained of residual fluid automatically whenever pressure fluid is shut off from the actuating chambers.

These and other objects of the invention will be apparent from the following specification, when taken with the acompanying drawings, in which.

For purposes of illustration, I have shown the invention as embodied in a valve for use with a relatively large conduit but it is to be understood that the invention is not restricted to any particular size of valve structure. As indicative of the relative size of the parts, the valve shown in the drawings has an inlet diameter of 102 inches and weighs about 135,000 pounds. The control apparatus illustrated in Fig. 1, may be, and preferably is, of the type described and claimed in my copending application, Ser. No. 426,872, filed February 8, 1930.

The valve body is circular in transverse cross-section and comprises two main sections which meet in a plane transverse to the axis of the valve, the body section or casting having an outer shell 1 and an inner shell 2 which are connected by radial ribs 3, and the needle section or casting having an outer shell 4 and inner shell 5 which are connected by radial ribs 6. The adjacent flanged edges of the two sections are bolted together and provide an annular fluid passage between the inlet end of the body section and the outlet end of the needle section. The central section of the valve body is of substantially larger diameter than at the ends, the change of diameter with respect to the axial length of the valve being such that the annular passage between the shells is favorable to the high velocity flow of fluid when the valve is opened. The movable element or needle of the valve needle case 5 includes an inner cylindrical section 7 and a tapered nose 8, the bolts 9 that connect these parts being countersunk and covered by the removable ring 10 of approximately triangular cross-section that is fixed within a similarly shaped recess in the nose 8.

The outer end of the shell 4 of the needle casting is counterbored to receive the valve seat 11 that is carried by an annular ring 12, the ring having a series of bolts 13 tapped into shell 4 to provide a fluid tight joint between those parts and a series of push-off bolts 14 for use when the parts are to be separated. The needle casting is counterbored, from its outlet end, for about one-half its length to receive the annular sleeve or liner 15 that is retained in position by the bronze bearing strips 16 that are secured to the inner surfaces of the radial ribs 6. The outer surface of the section 7 of the needle is formed of non-corrodible metal and accurately machined to cylindrical form for telescoping on liner 15 and guide strips 16.

Figures 1, 6, 7:
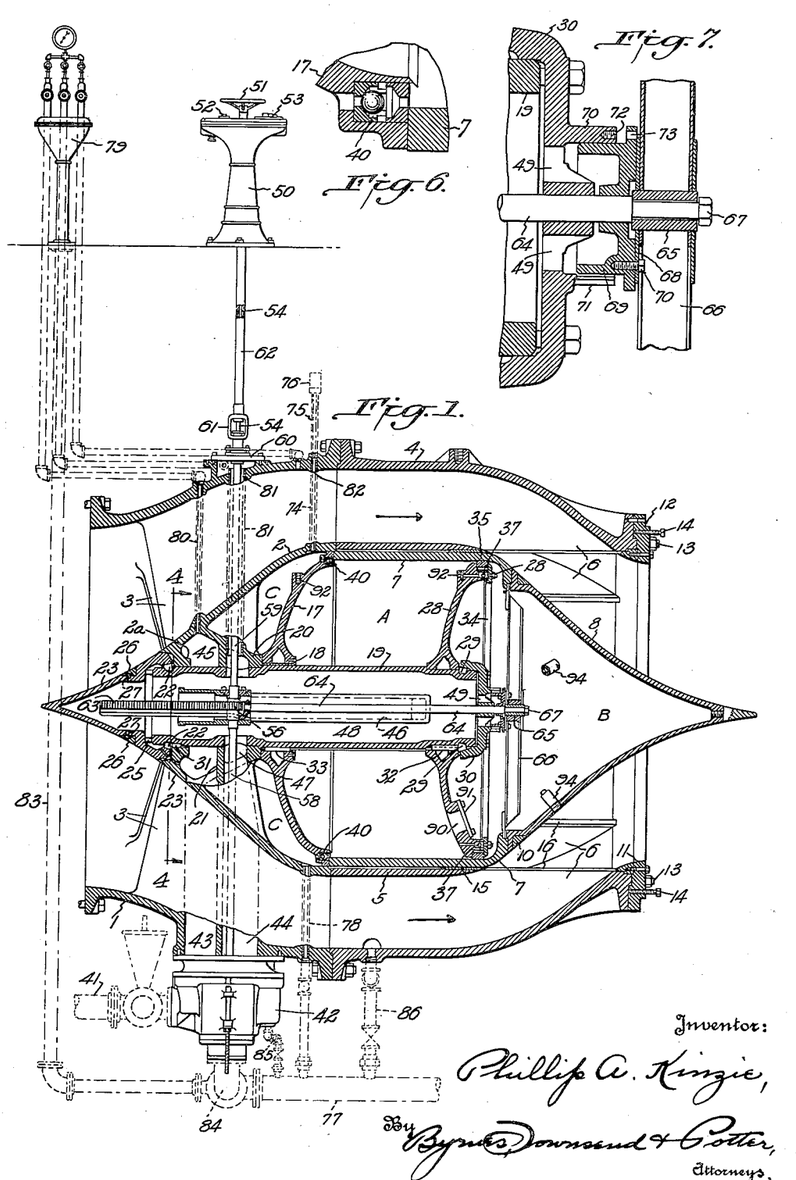
Fig. 1 is a vertical section through one embodiment of the invention, taken substantially on the longitudinal center line of the valve, and with parts of the associated control mechanism shown in side elevation.
Fig. 6 is an enlarged sectional view through one of the automatic check valves.
Fig. 7 is an enlarged sectional view of one end of the diaphragm tube and associated parts, and, Fig. 8 is a fragmentary vertical section illustrating a modified form of diaphragm tube.
Figure 2:
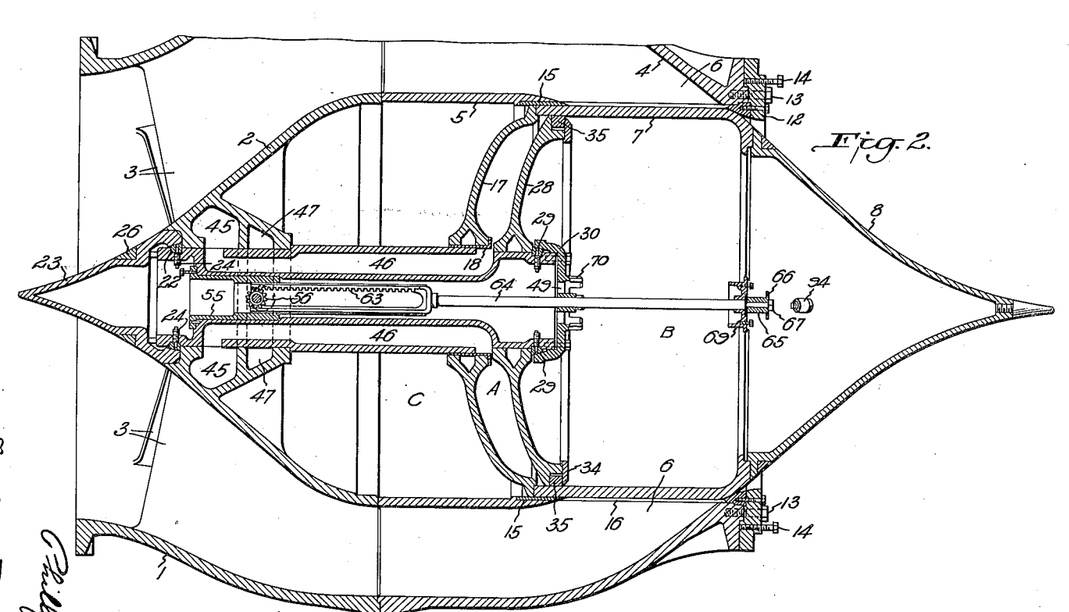
Fig. 2 is a horizontal central section through the valve shown in Fig. 1, but with the needle in closed position.
Figure 3:
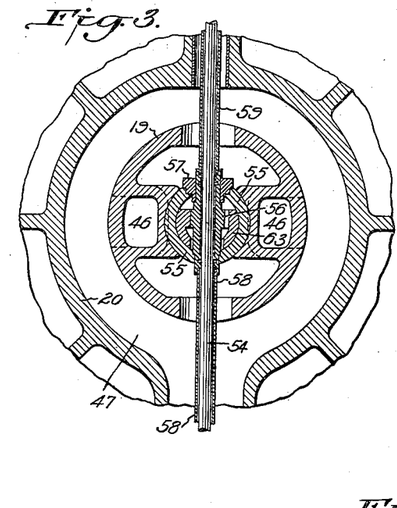
Figs. 3 and 4 are fragmentary transverse sections on vertical planes passed substantially axially of the control rod and on line 4—4, respectively, of Fig. 1.
Figure 4:
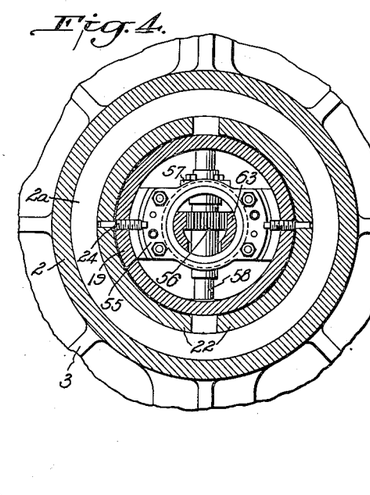

The inflow end of needle section 7 receives and has boltedly attached thereto the needle head 17 which is provided with a flange around its periphery which is shouldered to fit within the bore of section 7. Needle head 17 is deeply dished, as shown in Figures 1 and 2, which dish in its central part merges into a cylindrical hub containing a non-corrodible bushing 18 rigidly attached therein. This bushing is closely fitted over the cylindrical outer surface of diaphragm tube 19, which surface it slidingly engages, and is made substantially fluid-tight therewith.

A seat for the upstream end of the tube 19 is provided by the web or inturned edge, 2a, of the inner wall 2, the conical web 20 which flares inwardly from the inner face of the wall 2 and an intermediate web 21 whose inner edge is spaced from the edge 2a of wall 2 and the inner edge of the web 20. The radial face of the web 20 serves as a stop against which the hub of the needle head 17 strikes to limit the opening movement of the needle.

The shoulder formed by the reduction in diameter of the end of tube 19 also seats against this end face of web 20, and the circumferential edges of flange 2a and webs 20, 21 contact with the tube to provide compartments by which pressure fluid enters and leaves passages formed in the tube.

The upstream end of the diaphragm tube protrudes beyond the upstream face of the enclosing cone-shaped boss 20 which is an integral part of the body section of the valve casing, and this protruding portion is grooved circumferentially to receive the split locking or clamp ring 22 whose upstream face is concavely tapered to fit the mating taper of the nose 23 of the inner shell 2, while the downstream or opposite face lies in a plane perpendicular to its axis and bears against the finished upstream or inflow face of the boss 20. The groove in diaphragm tube 19 which receives the clamping ring is made of greater width than the ring, so that its vertical downstream wall face has clearance between it and the adjacent vertical downstream face of ring 22. Tube 19 has two tapped holes in which are threadedly engaged the ejector screws 24, Fig. 2, whose outwardly protruding ends of reduced diameter are entered into corresponding holes in each half of lock ring 22, and maintain them in their correct positions when the nose-piece 23 is being assembled, and whenever it is desired to remove the halves of lock ring from the locking position, nose-piece 23 is dismantled, ejector screws 24 are rotated until their shouldered faces rest against the adjacent bored surface of ring 22 and continued rotation of screws 24 forces the ring 22 out of the groove in 19. The outer circumference of ring 22 is turned on a taper so that the ring resembles a frustrum of a cone, with the apex end of the cone facing upstream, and over this truncated conical surface is clampingly fitted the mating conical surface contained within the downstream or outflow end face of nose-piece 23, whose largest outer cylindrical periphery is received and enclosed within the mating counterbore of the inner shell 2 and whose exposed upstream pointing conical surface forms the termination of the inner portion of the valve body. Nose-piece 23 is pulled into clamping engagement with ring 22 and so maintained in its proper position by bolts 25 which are threadably engaged in tapped holes in the upstream end face of tube 19. The heads of bolts 25 are sunk into the metal of nose-piece 23 and are covered by a ring 26 fitted to a circumferential groove formed in the nose-piece 23 to receive it, and ring 26 in turn is maintained in its correct position by screws 27, so that the heads of bolts 25 which are made accessible by removal of ring 26 are concealed thereby and the continuity of the smoothly curving conical surface of the nose-piece 23 is preserved.

From the above description it is evident that tightening of bolts 25 forces the conical bore of nose-piece 23 axially over the mating conical periphery of split lock ring 22 and so forces the halves of the ring radially inwards into the groove in tube 19, which inward movement in turn causes the matingly tapered upstream end surfaces of the ring and of the groove face in tube 19 into tight engagement which pulls the tube axially upstream until its shouldered face firmly engages the downstream end face of the boss 20 which encloses and carries it.

A fixed diaphragm 28 is mounted upon the reduced diameter section at the downstream end of the diaphragm tube 19, the general form of the diaphragm 28 resembling that of the dished needle head 17, and the diaphragm 28 is securely retained in place by a split clamping ring 29 which is forced into a peripheral recess in the tube 19 and against the hub of diaphragm 28 by tube head 30 that is bolted over the open end of tube 19. The interior of the needle case and needle is thus divided into pressure chambers A and B at opposite faces of the diaphragm 28 and a cavity C at the upstream face of the needle head 17, which cavity is preferably open to the atmosphere.

A key 31 locks the tube 19 against rotary movement in the valve body and a similar key 32 prevents the diaphragm 28 from turning on the tube. The needle is restrained to a purely axial movement as it slides in the needle case by a key 33 that is mounted on the hub of the needle head and fits within a keyway on the diaphragm tube 19.

The downstream face of the diaphragm 28 has an annular flange against which the rim 34 is bolted to provide a deep groove in which is seated the piston ring 35, the ring being of the type which will expand and contract radially to accommodate itself to the inner cylindrical surface of the section 7 of the needle, thus providing a fluid-tight seal which prevents the passage of pressure fluid around the edge of diaphragm 28. As shown in the enlarged detail view, Fig. 5, the portions of the diaphragm 28 that are adjacent the needle section 7 and the piston ring 35 are coated with an anti-corrosive metal 36 which is accurately machined and, with the rim 34 of non-corrosive metal, provides a ring seat which insures the proper functioning of the piston ring under the most adverse conditions. The piston ring 35 is also made of a non-corrosive metal and, except only as to size, is similar to the eccentrically bored piston rings commonly employed in internal combustion engines, the ends of the ring being of the usual stepped construction to prevent leakage at the joint. A considerable clearance is provided between the ring 35 and the bottom of the ring groove and pressure fluid is automatically introduced behind the ring 35 to expand it radially and bring its periphery into intimate contact with the interior cylindrical surface of the needle.

Figure 5:
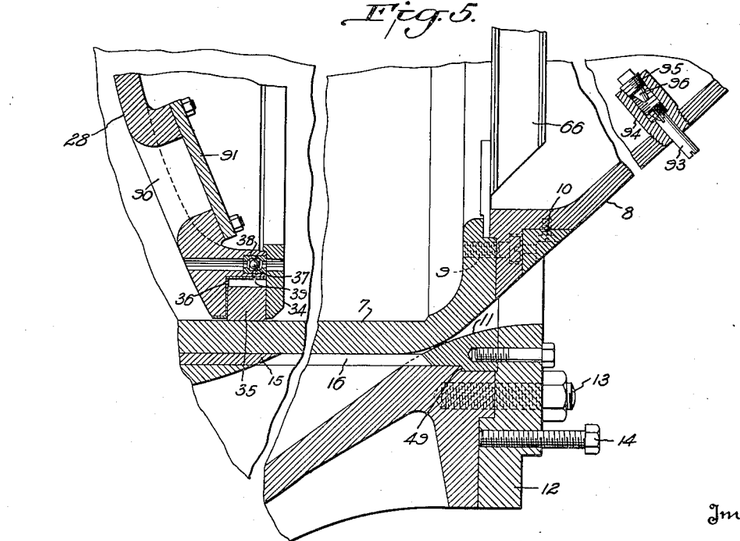
Fig. 5 is an enlarged fragmentary view of parts shown in Fig. 1.

The automatic admission of fluid pressure between the ring 35 and the bottom of the groove is accomplished by means of two special ball check valves 37, each mounted in twin bronze ball cages 38 contained in counterbored passages in the flange of diaphragm 28 and maintained in their proper positions therein by ring retainer 34. These check valves are placed on the vertical center line of the diaphragm 28 and radial ports 39 afford communication between the main passageway and the piston ring seat. The twin bronze cages which contain each ball element are so arranged and shaped in their interiors, as shown in Fig. 5, that whenever pressure fluid passes through the axially drilled ports in each cage, from either chamber A or chamber B as the case may be, it impinges against the ball and rolls it into seating engagement with the seat in the cage adjacent to the opposite or passive chamber, thereby closing passage of fluid into that chamber and at the same time opening direct communication from the active chamber to the clearance in the circumferential groove beneath the piston ring.

The check valves are so designed that the balls 37 will roll into middle or neutral position whenever the pressures in chambers A and B have approximately the same value. A series of similar double acting check valves 40 are arranged at the periphery of the needle head 17 to afford a controlled communication between the chamber A and the cavity C. The greater number of check valves 40 is required at the needle head 17 since the cavity C is at atmospheric pressure and, in valves of large diameter, the hydrostatic pressure of water in chamber A would hold the lower check valves closed even though the pressure at the top of the chamber A falls to such value that the upper valve 40 opens.

The vertical spacing of the valves 40 is such that the valves open successively, from the upper one downwardly, as the level of the fluid falls in chamber A.

The operation of the check valves will best be understood by first referring briefly to the general method of operation of the needle valve. With cavity C at a relatively low pressure, which may be, and preferably is atmospheric, the forces available for operation of the needle are:

*Opening forces*

(a) Pressure within chamber A acting against the annular concaved face of the needle head 17, and (b) conduit pressure acting against part or all of the outside conical end of the needle sleeve 7 and nose-piece 8, depending upon whether the needle is closed against its seat or is partly or wholly open, it being understood that the valve is normally so arranged that the flow through the valve is in the direction of the arrows in Fig. 1, although this position may be, and in some installations is, reversed.

*Closing forces*

Pressure within chamber B and acting against the conical inner face of the needle.

During the normal service operation of the valve, the check valves 40 in needle head 17 are seated towards cavity C to prevent the escape of pressure fluid from chamber A. The ball valves 37 in the fixed diaphragm 28 will seat towards the chamber which has the lower operating pressure, and the pressure in the other or active chamber will operate, through ports 39 to hold the piston ring 35 in expanded position.

When the valve is out of service or is shut down for inspection and maintenance purposes, the fluid pressure in both chambers falls to a low value and the upper valves of both chambers and the first adjacent pair of valves 40 of chamber A fall into neutral position. The upper valve 40 admits air from cavity C to chamber A, and the next lower valves 40 drain fluid from chamber A into cavity C. As chambers A and B are at approximately the same pressure, air enters chamber B at the upper valve 37 and fluid drains out through the lower valve. As the fluid level in chamber B falls off at the same rate as the level in chamber A, the lower valve 37 remains open throughout the drainage cycle and but one fluid drain valve is required. Similarly, when the valve is placed in commission, water is slowly introduced successively into chambers B and A, thus effecting an automatic venting of air from both chambers.

This automatic draining and automatic air venting of the actuating chambers of the valve is of major importance to the safety of the valve because it insures that these chambers will not be subjected to the hazard of freezing with the attendant rupturing of the main castings, likewise it insures that trapped air with its explosive effect will not be present when the valves are again put into service.

Pressure fluid for actuating the valve is supplied through a pipe line 41 which may, and usually will, be connected to the upstream side of the conduit which the valve controls. The pressure supply line 41 enters control valve casing 42 in which a valve, such as shown in detail in Figs. 7, 12 and 13 of my copending application Ser. No. 426,872, controls the supply of pressure fluid to the passages 43, 44 that are formed in the rib 3.

As shown in Fig. 2, the passage 43 communicates, through chamber 45 formed in the conical boss 20 of the body casting, with passageways 46 within the diaphragm tube 19 that open into chamber A closely adjacent the diaphragm 28, thus providing for a throttling of fluid flow from compartment A as the needle approaches fully closed position.

The passage 44 communicates with chamber B through a chamber 47 in the conical boss 20, the interior passage 48 of the tube 19, and an annular series of ports 49 in the tube head 30.

A type of combined manual and automatic control which is particularly useful with the present valve is disclosed and claimed in my copending application Ser. No. 426,872. Reference is made to that application for a detailed description of the construction and operation of the control system. For a full understanding of the present invention, it is sufficient to state that the control valve in casing 42 includes two elements, one of which is adjusted manually while the second is moved by the valve needle.

The control apparatus includes a stand 50 carrying a hand wheel 51 and pointers 52, 53, for indicating the positions of adjustment of the manual and automatic controls. The manual control includes a rod 54 which is operated by the hand wheel 51 and extends downwardly to control valve casing 42 through the tubular shaft which forms a part of the automatic control.

The upstream ends of the walls of the passages 46 in the diaphragm tube 19 are counterbored to receive a bushing 55 that is bolted to the end walls of the passages. The bushing 55 provides bearings for a pinion 56, the upper bearing 57 being removable to permit insertion of the pinion within the bushing.

The lower section 58 of the tubular shaft is splined to the pinion 56 and extends downwardly into the control valve casing 42. An upper shaft section 59 is similarly splined to the bushing and extends, through a packed bushing 60, to the exterior of the valve casing where it is joined, by coupling 61, to the tubular shaft section 62 which extends into control stand 50 for actuating the indicating pointer 53.

A rack bar 63 which meshes with pinion 56 is slidably supported by the inner surface of bushing 55 and has fixed thereto a rack shaft 64 that extends through and is slidably supported by the tube head 30.

The outflow end of rack shaft 64 is of reduced diameter and extends somewhat loosely through the hub 65 of a needle spider 66, the outer end of shaft 64 being further reduced in diameter and threaded to receive the nut 67. The axes of shaft 64 and hub 65 coincide with the axis of the needle valve and the shoulders defining the section of shaft 64 that is received within the hub 65 are spaced apart by a distance slightly in excess of the length of the hub, thus allowing the parts to accommodate themselves one to the other, and the spider 66 to turn on shaft 64 while securing the parts against relative longitudinal movement. The needle spider, which may be an I beam, has flat ends which are rotatably received in a deep cylindrical recess between the meeting edges of the sections 7 and 8 of the needle, thus constraining the spider and rack shaft to partake of the longitudinal movement of the needle.

The upstream face of the spider 66 has fixed thereto a flange 68 to which a cup-shaped casting 69 is secured by a series of bolts 70. The outflow face of the tube head 30 is provided with an annular flange 71 which is deeply notched or serrated from its downstream end. The flange 71 is accurately counterbored to receive the casting 69 as the needle valve approaches its wide open position. When the casting 69 enters flange 71, the escape of fluid from chamber B into the tube 19 takes place laterally through the serrations or notches in the flange 71, and the effective areas of these openings are progressively reduced as the movement of the needle valve continues, thereby building up a resistance to the escape of fluid, and consequently a pressure within chamber B. The opening speed of the needle is therefore retarded as it approaches the rearward limit of its range of movement. This is essential to the safe operation of large valves and is particularly important as the type of combined manual and automatic control gives rise to needle velocities much higher than those previously employed.

The casting or cup 69 also serves as a convenient means for permitting inspection of the operation of the piston ring. The projecting flange 71 of the tube head 30 is provided with a series of bores 72 that are threaded to receive bolts 70. The flanged end of casting 69 has apertures 73 through which bolts 70 may be inserted, after their removal from flange 68, to carry the casting 69 into the complete cylindrical section of the counterbore of flange 70, thus preventing fluid within tube 19 from escaping into the needle at the outflow side of diaphragm 28. By introducing pressure fluid into chamber A, the efficiency of the sealing ring 35 may be determined by visual inspection; it being understood that the needle nose 8 must first be removed to permit access to the interior of the needle. This test also affords a direct indication as to the proper functioning of the ball valves 37 in the diaphragm 28.

Due to the use of the ball valves, the arrangements for venting air and for draining fluid from the valve are simpler than those described in my copending application. Cavity C is in constant communication with the atmosphere through a pipe 74 which extends through a bore in the upper rib 3 to join breather pipe 75 that terminates in a strainer 76 which prevents foreign materials from being drawn into the cavity when air enters through the breather. Fluid is drained from cavity C to the drain header 77 through a pipe 78 that extends through the lower rib 3. Individual pipe lines extend from a vent stand 79 to the vent pipe 80 of fluid compartment 45, the vent pipe 81 of compartment 47, and the venting port 82 in the upper wall of the outer body casing 1. The vent stand communicates through pipe 83 with the drain header 77 so that fluid entrained in the air or escaping through the vent pipes after removal of all air passes off through the drain header. The control valve casing 42 discharges fluid from the pressure chambers A, B to the header 77 through pipe 84, and may be drained to the header through valved pipe line 85. The fluid passageway through the valve is likewise connected to the drain header 77 by a valved pipe line 86.

As shown in Fig. 1, the lower portion of the diaphragm 28 may be provided with a port 90 normally closed by a cover plate 91 which permits inspection and cleaning of the chamber A.

In valves of large size, upon removal of the needle nose 8 and cover plate 91, a man may readily pass his hand and arm through port 90 to determine whether or not foreign material is collecting in the chamber and, with appropriate scrapers and tools, to remove such deposits from the chamber.

To facilitate handling of the dished end walls of chamber A, these castings 17 and 28 are provided with threaded bosses 92 for receiving screw hoisting eye blots. To permit the lifting of the needle nose 8 by a cable passed around the same at its center of gravity, the needle nose is provided with a series of pins 93 which can be extended to project beyond the tapered surface of the needle. As shown in Fig. 5, the inner heads of pins 93 are threaded into the cylindrical bushings 94 which are threaded into the wall of the nose 8 from the interior to terminate flush with the outer wall. The inner ends of the bushings 94 are closed by threaded plugs 95 which have conical projections 96 which are engaged by correspondingly shaped inner walls of the enlarged and split heads of the pins 93 when the latter are screwed into the bushings to bring the outer ends of the pins flush with the needle surface. The expansion of the pin ends locks them securely in place when the valve is in operation and water under high velocity is passing over the outer ends of the pins. The outer ends of the pins are provided with saw cuts to receive a tool for turning them in bushings 94. Upon projecting the pins from their bushings, a cable sling wrapped circumferentially about the nose, and in basket weave fashion with respect to the pins 93, will not slip from the sharply tapered surface of the needle when the latter is hoisted or transported by means of the sling.

Figure 8:
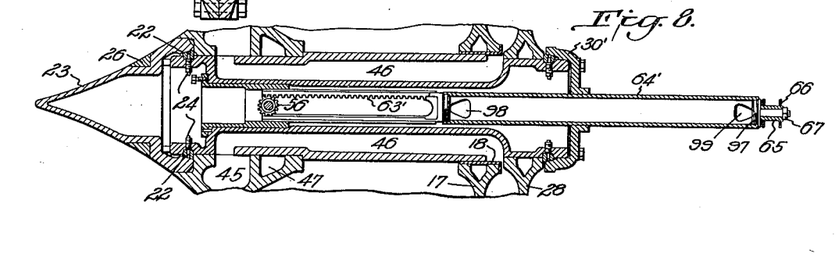

An alternative construction for securing a satisfactory cushioning of the needle as it approaches wide open position is illustrated in Fig. 8. Many of the parts are, or may be, substantially identical with those illustrated in the previous views and are therefore identified by the same reference numerals. The principal difference in the two valve structures is based upon the use of a hollow rack shaft 64' in the transfer of pressure fluid to and from chamber B. The upstream end of the tubular shaft is threaded upon and closed by the end of rack 63', and the opposite end is closed by a plug 97 that has a reduced diameter section received somewhat loosely in the hub 65 of spider 66. The tube cap 30' is not provided with fluid ports but the opposite ends of the tubular shaft 64' have ports 98, 99 therethrough which have approximately the form of triangles with rounded vertices, the bases of the triangles being directed towards each other. As the needle approaches wide open position, the effective aperture provided by port 99 is decreased as the port becomes obstructed by the tube cap 30'. Similarly, the port 98 is obstructed to a greater or less degree as the valve approaches fully closed position.

It is believed that the operation of the valve will be apparent from the above description. Without reciting in detail the successive steps in the assembling of the valve, it should be evident that the component parts are so designed and so connected into the complete structure as to facilitate inspection and repair. Due to the provision of a substantially fluid-tight joint between the pressure chambers which are located entirely within the needle, the valve may be opened or closed or put in any desired intermediate position, with the conduit leading to the valve dry, by forcing water into the pressure supply line 41 from any convenient manually or power operated pump.

With the forces as noted above available, the needle value can be opened or closed, or automatically held in any intermediate position by automatic regulation of the pressure intensities within chambers A and B through the agency of the control mechanism described and illustrated in my copending application already referred to, and by coupling the discharge line from a power or manually operated force pump to the supply line 41 connected to control valve casing 42, the needle may be opened or closed or put in any intermediate position desired, with the conduit leading to the valve dry. This is a very valuable feature as it permits easy inspection and facilitates maintenance work as, and is made possible, by the fluid-tight construction of the actuating chambers secured by the placing of both of them entirely within the needle, and the means provided by the control mechanism for introducing and discharging the pressure and exhaust fluid to and from the appropriate chambers without appreciable loss due to leakage.

It will be obvious to those skilled in the art to which the invention relates that modifications may be made in the details of construction of the parts and their relative arrangement without departing from the spirit of my invention or the scope of the following claims.

I claim:

1. A valve of the large size needle type adapted to control fluid flow in large diameter conduits and to be operated by pressure fluid taken from the controlled conduit, said valve comprising a valve housing including a cylindrical needle casing, a tube within said casing and supporting a diaphragm, a needle slidable within said casing and having a needle head cooperating with said diaphragm to divide the space within said needle into two chambers for receiving pressure fluid, a portion of said casing cooperating with said needle head and needle casing to provide a cavity, and means comprising a permanently open vent for continuously maintaining a substantially atmospheric pressure within said cavity.

2. The invention as set forth in claim 1, in combination with means at the periphery of said diaphragm for preventing leakage of pressure fluid along the junction of said diaphragm and the interior of said needle.

3. A needle valve of the type including a casing having a fluid conduit therethrough, a needle slidable in said casing to control fluid flow through said conduit, wall means cooperating with said needle to define a plurality of chambers for receiving pressure fluid to actuate said needle, packing means preventing inadvertent leakage between said chambers, and means providing a restricted venting communication between the upper portions of said chambers, said communication means comprising an opening in the upper portion of the wall means forming the partition between said chambers.

4. A needle valve of the type including a casing having a fluid conduit therethrough, a needle slidable in said casing to control fluid flow through said conduit, wall means cooperating with said needle to define a plurality of chambers for receiving pressure fluid to actuate said needle, packing means preventing inadvertent leakage between said chambers, and means comprising a restricted drainage communication between the lower portions of said chambers, said communication means comprising an opening in the lower portion of the wall means forming the partition between said chambers.

5. In a valve, the combination with a needle casing, a needle and elements cooperating therewith to define a plurality of chambers for receiving pressure fluid and a cavity, of restricted openings in the upper and lower portions of the walls defining said chambers to automatically vent air from said chambers into said cavity and to drain said chambers into said cavity.

6. The invention as set forth in claim 1, in combination with means at the periphery of said diaphragm and actuated by pressure fluid in one of said chambers for preventing leakage of pressure fluid between said chambers.

7. A needle valve of the type in which a needle member telescopes within a cylinder, and means cooperating with said needle member and cylinder to define a plurality of pressure chambers, characterized by the fact that the walls of said chambers are provided with venting means for automatically venting said chambers to atmosphere when the pressure within said chambers is not substantially in excess of atmospheric.

8. In a needle valve, the combination with a housing and a needle casing defining an annular conduit, a needle slidable in said needle casing, means cooperating with said needle and needle casing to define three tandem compartments, and means including a pressure fluid and an exhaust fluid passage for establishing fluid pressures in at least two of said compartments to control the operation of said needle, of a vent pipe and a drain pipe each opening into one of said compartments, and venting passages and drainage passages respectively affording communication between the said compartment and each of the other compartments.

9. A needle valve as claimed in claim 8, wherein said vent pipe is continuously open to atmosphere and said drain pipe is continuously open to waste.

10. A needle valve of the type in which a diaphragm is supported within a hollow needle to divide the space within the needle into two pressure chambers, characterized by valve means in the wall of one chamber and operable automatically to vent the chamber to atmosphere when the pressure within the said chamber falls approximately to atmospheric.

11. The invention as set forth in claim 10, wherein said diaphragm is provided with a plurality of passages which terminate at the respective chambers, and check valves are provided in said passages to close the same when the pressures in said chambers are substantially different and to open the passages when said pressures are approximately equal.

12. In a valve, the combination with a needle casing, a needle and elements cooperating therewith to define a plurality of chambers for receiving pressure fluid, of passages in walls defining said chambers, and means automatically closing said passages upon the establishment of substantially different pressures at the opposite ends of the respective passages.

13. In a valve, the combination with a needle casing, a tube and a diaphragm cooperating with a needle and a needle head to define two pressure chambers within said needle and a cavity between said casing and said needle head, of means providing free communication from said cavity to atmosphere and to a pressure fluid drain, and valve means operative to prevent the escape of pressure fluid from said chambers, said valve means comprising check valves opening automatically when the pressures at the opposite faces thereof are approximately equal to permit transfer of fluids between said chambers and said cavity.

14. In a needle valve, the combination with a needle casing having a frustro-conical open end, and a plurality of webs within said end, said webs being apertured in alinement with said open end to define a bore, of a diaphragm tube insertable into said bore from the interior of said needle casing, of means within said needle casing securing said tube against axial displacement with respect to said needle casing.

15. The invention as set forth in claim 14, wherein said tube has a radial shoulder seated against a surface of one of said webs, and said securing means includes a clamping ring seated in a circumferential groove in said tube and bearing against another web surface.

16. The invention as set forth in claim 14, wherein said securing means includes a body secured to said tube, said body having a tapered outer surface merging into the adjacent outer surface of said needle casing.

17. In a needle valve, an outer housing and a needle casing, radial ribs joining said casing to said housing, a plurality of spaced webs projecting inwardly from said casing and having openings therethrough, and a diaphragm tube extending through the openings in said webs, said tube being provided with two passages for pressure fluid and the inner edges of said webs seating against the periphery of said tube to form two compartments communicating with the respective fluid passages of said tube.

18. In a needle valve, an outer housing and a needle casing, radial ribs joining said casing to said housing, a plurality of spaced webs projecting inwardly from said casing and having openings therethrough, a diaphragm tube extending through the openings in said webs, the housing being provided with a seat to which a control valve may be secured, said seat being in alinement with one of said ribs, and passages extending through the said rib and communicating with the respective spaces between adjacent pairs of webs.

19. In a needle valve, a body section and a needle section having inner and outer walls defining an annular fluid passage, a hollow needle slidable within the inner wall of said needle section, a diaphragm within and cooperating with said needle to provide a plurality of pressure chambers, and a diaphragm tube secured to said body section and carrying said diaphragm, webs at the interior of the inner wall of said body section and cooperating with the circumferential wall of said tube to define a pair of compartments, and passages within said tube affording communication between said pressure chambers and the respective compartments.

20. In a needle valve of the type in which a diaphragm is located within a hollow needle, the combination with a housing comprising a body section and a needle section having double walls defining an annular fluid passage, a needle slidable within the inner wall of said needle section, a tube secured to said body section, a diaphragm within said needle and secured to said tube, a needle head secured to said needle and slidable on said tube, passages within said tube and communicating with the chambers into which said diaphragm divides the space within said needle, and relatively short webs on said body section at one end thereof cooperating with said tube to define pressure fluid compartments communicating with the respective passages and conduits extending between said compartments and the exterior of said housing.

21. The invention as set forth in claim 20, wherein said tube has end portions of reduced diameter extending through and seated respectively within the hub of said diaphragm and within the webs and inner wall of said body section.

22. In a needle valve of the type in which a needle valve is slidably supported with respect to a needle casing and a diaphragm, a diaphragm tube having circumferential grooves adjacent the respective ends thereof, a diaphragm and a portion of said needle casing having alined bores for receiving the ends of said diaphragm tube, split rings in said grooves for preventing movement of said tube with respect to said diaphragm and casing, and means secured to the ends of said tube for retaining said rings in their respective grooves.

23. In a needle valve of the type in which the interior of the movable needle is divided into a plurality of pressure chambers by a stationary diaphragm, a valve housing comprising a body and a needle section having inner and outer walls defining an annular fluid passage, the inner wall of said body section being centrally apertured and having an outer surface approximating that of a frustrum of a cone, the inner wall of the needle section being cylindrical, a needle telescoping in said needle section and having a tapered nose, a diaphragm tube having an end extending into the aperture of said body section, a diaphragm carried by said tube, a needle head secured to said needle and cooperating therewith and with said diaphragm to define two pressure chambers, means securing one end of said tube to said body section of said housing, and means securing said diaphragm to the other end of said tube.

24. The invention as set forth in claim 23, wherein said first securing means includes a member having an exterior tapered surface merging into the outer surface of the inner wall of said body section of the housing.

25. In a needle valve, a body section comprising inner and outer walls of approximately frustro-conical form, ribs connecting said walls, and a pair of webs extending inwardly from said inner wall adjacent the smaller end thereof, said webs having central openings in alinement with the opening in said inner wall and adapted to cooperate with a cylindrical body seated against said webs and wall to define a pair of pressure fluid compartments.

26. The invention as set forth in claim 25, in combination with a conical nose-piece, and means securing the same to said body member to form a continuation of said inner wall.

27. In a needle valve, the combination with a needle casing having a closed end, a tube extending from said end and carrying a diaphragm, and a needle body having a head slidable on said tube, said head and the closed end of said needle casing constituting a cavity and said diaphragm dividing the space within said needle body into two pressure chambers; of sealing means at the periphery of said diaphragm to prevent leakage transfer of pressure fluid between said pressure chambers, venting means for continuously maintaining a substantially atmospheric pressure within said cavity, and drainage means for continuously draining said cavity to a region of lower pressure than that of pressure fluid supplied to said pressure chambers for actuation of said needle body.

28. The invention as set forth in claim 27, wherein said sealing means comprises a radially expanding sealing ring seated in a groove at the periphery of said diaphragm, passages between said groove and both of said pressure chambers, and valve means in said passages for preventing communication between said groove and the chamber subjected to the lesser fluid pressure.

29. In a needle valve, the combination with a needle casing of cylindrical form and having an open end, a diaphragm tube, a diaphragm supported by said tube and positioned at the open end of said casing, a hollow needle body slidable in said casing, a tapered nose secured to one end of said body, a needle head secured to the other end of said body and slidable on said tube, the peripheral edge of said diaphragm at the needle nose side thereof being notched, an annular plate fixed to said diaphragm and cooperating with the notched edge to define a ring seat, a sealing ring in said seat and engaging the inner surface of said needle body.

30. The invention as set forth in claim 29, wherein said diaphragm is provided with a transverse passage adjacent to and communicating with said ring seat, said passage being counterbored from the side adjacent said annular plate, a pair of oppositely disposed valve cages in the counterbored portion of said passage, and a ball valve between said cages, said plate overlying a portion of one cage for retaining the cages in said passage.

31. In a valve of the type described, a needle comprising a cylindrical section, a tapered nose secured to said section, and a plurality of pins spaced about the periphery of said nose at the transverse plane through the center of gravity thereof, said pins having threaded inner ends supported in sockets on said nose, whereby said pins may be turned to project them beyond the outer surface of said nose or to withdraw them to bring their outer ends flush with said surface.

32. The invention as set forth in claim 31, wherein said sockets comprise bushings threaded into said nose from the interior thereof, end plugs in said bushings and having conical ends directed towards said pins, and the inner ends of said pins are split and counterbored to match said conical ends, the conical ends of said plugs being so located that said pins engage the same when the outer ends of the pins lie in the surface of said nose.

33. In a needle valve, a needle casing, a tube within said casing and supporting a diaphragm, a needle slidable within said casing and having a nose closing one end thereof, said tube being hollow to provide a passage communicating with the pressure chamber formed between said diaphragm and the needle nose, an annular flange projecting from said tube and constituting the inner end of said passage, and a cup-shaped member fixed to said needle and cooperating with said flange to restrict the flow of pressure fluid through said passage as the needle approaches one limit of its range of movement.

34. The invention as set forth in claim 33, wherein said annular flange is notched, and said cup-shaped member is moved by said needle to progressively decrease the lateral openings provided by said notches as the needle approaches full open position.

35. The invention as set forth in claim 33, wherein said annular flange has a cylindrical surface machined to snugly engage the said cup-shaped member, that portion of the cylindrical surface engaged by the member in normal operation of the valve being notched to provide lateral openings for the passage of pressure fluid when said member engages said annular flange, and means operable upon detachment of said member from said needle for clamping said member to said annular flange to prevent flow of pressure fluid through said annular flange.

36. In a needle valve, a housing, a needle slidable within said housing, a tube secured to said housing and supporting a diaphragm within said needle, inner walls within said tube defining a pair of passages separate from the interior space within said tube, a rack within said tube and connected to said needle, a bushing supported by and between said interior walls, and a pinion pivoted upon said bushing and engaging said rack.

37. The invention as set forth in claim 36, wherein said rack is slidably supported by the inner surface of said bushing.

38. The invention as set forth in claim 36, wherein one side of said bushing is counterbored to provide a bearing for the pinion sleeve, and the opposite side is provided with an aperture through which the pinion may be introduced within the bushing, in combination with a bearing closing said aperture and providing a pivotal support for said pinion.

39. The method of controlling the flow in a pressure conduit containing an annular housing closed to the conduit throughout on its upstream end and spaced from the conduit walls to provide a fluid passage therearound, and telescopically receiving in the downstream end a hollow valving element closed at both ends and interiorly divided by a diaphragm wall stationary with the housing into complementary pressure chambers, the said valving element operating against a seat in the conduit, which method comprises selectively admitting pressure to the chamber on one side or the other of said fixed diaphragm wall while relieving pressure on the other side, continuously maintaining the interior of the annular housing free of pressure and liquid whereby unrestricted movement of the valving element is accomplished by the pressure admitted on the selected side of the fixed diaphragm only, and reestablishing and maintaining equilibrium of pressures on both sides of the fixed diaphragm when the valving element attains a selected position.

PHILLIP A. KINZIE.